(12) United States Patent
Huckey

(10) Patent No.: US 9,631,546 B2
(45) Date of Patent: Apr. 25, 2017

(54) WATER PUMP ADAPTOR PLATES IN A COOLANT ASSEMBLY

(71) Applicant: Brent W. Huckey, Mesa, AZ (US)

(72) Inventor: Brent W. Huckey, Mesa, AZ (US)

(*) Notice: Subject to any disclaimer, the term of this patent is extended or adjusted under 35 U.S.C. 154(b) by 1 day.

(21) Appl. No.: 14/857,573

(22) Filed: Sep. 17, 2015

(65) Prior Publication Data

US 2017/0082011 A1   Mar. 23, 2017

(51) Int. Cl.
*F01P 5/10* (2006.01)
*F02B 67/06* (2006.01)
*F01P 5/12* (2006.01)

(52) U.S. Cl.
CPC  *F01P 5/10* (2013.01); *F01P 5/12* (2013.01); *F02B 67/06* (2013.01)

(58) Field of Classification Search
CPC ...... F01P 5/10; F01P 5/12; F01P 11/00; F01P 11/04; F02B 67/04; F02B 67/06; F02B 77/00
USPC ............ 123/195 C, 41.44, 41.47; 415/213.1; 285/328
See application file for complete search history.

(56) References Cited

U.S. PATENT DOCUMENTS

| | | | | |
|---|---|---|---|---|
| 4,215,658 A | * | 8/1980 | Smith, Jr. ................. | F01P 5/10 123/195 A |
| 6,146,111 A | * | 11/2000 | Coleman .................... | F16H 7/14 417/359 |
| D645,478 S | * | 9/2011 | Iwanicki .......................... | D15/7 |
| 8,424,497 B2 | | 4/2013 | Iwanicki | |
| 8,511,263 B2 | * | 8/2013 | Ayukawa .................. | F02F 1/10 123/195 R |
| 2002/0012593 A1 | * | 1/2002 | Okuda ...................... | F01P 5/12 417/362 |
| 2002/0136633 A1 | * | 9/2002 | Ozawa ...................... | F01P 5/10 415/168.2 |
| 2007/0266806 A1 | | 11/2007 | Jones | |
| 2010/0162974 A1 | | 7/2010 | Yamanishi et al. | |

OTHER PUBLICATIONS

Moroso 2013 Product Catalog, published Jan. 10, 2013, referencing Water Pump Spacer Kit Part #63511, obtained at https://issuu.com/moroso/docs/moroso-product-guide-2013-pt1, p. 24.*

* cited by examiner

*Primary Examiner* — Grant Moubry
(74) *Attorney, Agent, or Firm* — Mark V. Loen

(57) ABSTRACT

The embodied invention is directed toward providing a flexible power belt routing to peripheral components by relocating the water pump to a substantially central location on the engine. This is accomplished by designing two adaptor plates which route the coolant water between the water pump and the engine coolant ports. When the water pump is centrally located on the engine, other peripheral belt driven components, such as air conditioning and power steering, can be suitably located around the front of engine so as to permit the motor to be retrofitted into various engine spaces in a variety of cars, trucks, and vehicles.

6 Claims, 5 Drawing Sheets

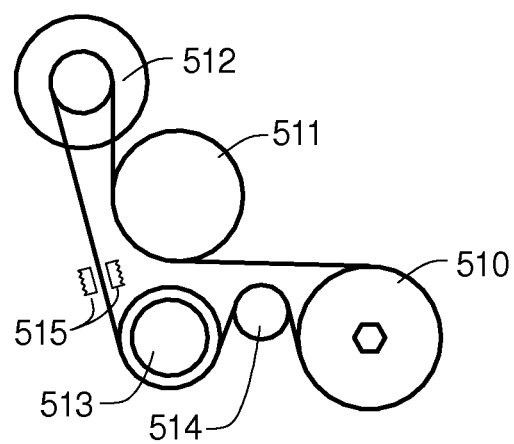
FIG. 5A
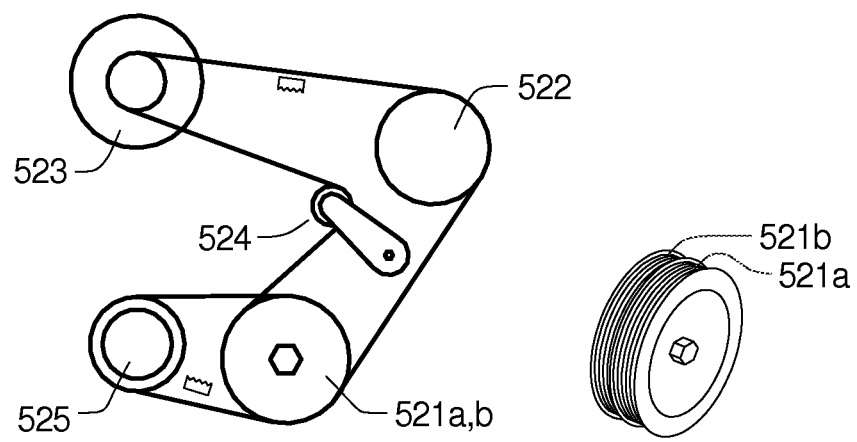
FIG. 5B
FIG. 5C

WATER PUMP ADAPTOR PLATES IN A COOLANT ASSEMBLY

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward modifying an engine so as to it to fit inside a defined space within a car. It is further directed toward certain modifications that allow the engine to fit in alternate spaces by relocating the water pump to a different power belt position. By mounting the water pump in a substantially centered position, a variety of alternate spaces become available for the overall engine to fit into car spaces.

(2) Description of Related Art

It has been the desire of automobile enthusiasts to own a particular style of older car (classic or vintage car) that runs acceptably to current emission standards, provides exceptional power and torque, and also has respectable gas mileage. Recognizing the need in the marketplace, auto manufacturers have developed engines that provide for this market. In particular, General Motors has developed and sold an engine suitable for cars and trucks that meet the needs of the market. The Engine is purchased as a stand-alone unit, with or without a transmission, often called a 'crate engine' because it is shipped in a crate. In recent years, General Motors has put a significant development effort to sell an engine with improved specifications.

General Motors has developed various small block, V-8 engines intended for use in General Motors line of rear wheel drive cars and trucks. The GM small-block V-8 engines are generally all-aluminum, especially the performance oriented engines, while others are made from cast iron.

The small-block engine has been sold in Corvette and a wide variety of other GM vehicles, sport cars to full size trucks. GM designed the engine to be compact for the power output, making the engine popular for engine swaps, import cars, kit cars, hot rods, boats, buggies, and even light aircraft.

The GM small block V8 Generation 5 engine has had a number of design iterations, from Generation 1 to the current Generation 5. Currently, Generation 5 engines feature a revised cooling system and all-new cylinder heads, an engine-driven high-pressure fuel pump, direct-injection system, active fuel management, and continuously variable valve timing. Generation 5 engines are normally aluminum blocks with aluminum cylinder heads.

It is desirable for a car enthusiast to be able to adapt the GM small block engine to various engine compartment spaces. This involves re-locating the water pump to a more desirable location. It is also desirable to have the ability to add power steering and chose more modern peripheral components such as air conditioning compressor units, alternators, brake enhancements, and power steering pumps.

BRIEF SUMMARY OF THE INVENTION

The embodied invention is directed toward providing a flexible power belt routing to peripheral components by relocating the water pump to a substantially central location on the engine. This is accomplished by designing two adaptor plates which route the coolant water between the water pump and the engine coolant ports. When the water pump is centrally located on the engine, other peripheral belt driven components, such as air conditioning and power steering, can be suitably located around the front of engine so as to permit the motor to be retrofitted into various engine spaces in a variety of cars, trucks, and vehicles.

BRIEF DESCRIPTION OF THE SEVERAL VIEWS OF THE DRAWING(S)

FIGS. 5A-5C show the manufacturer belt drive routing designs.

DETAILED DESCRIPTION OF THE INVENTION

Figure 1C:
FIGS. 1A-1G is a left hand adaptor plate.
Figure 1B:
Figure 1A:
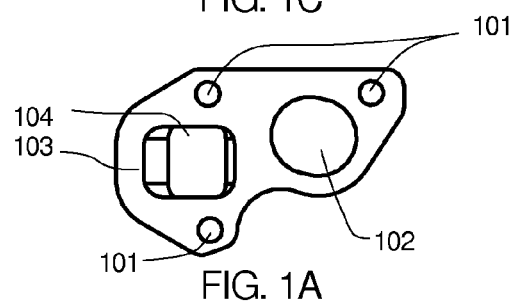
Figure 1D:
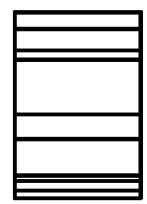
Figure 1E:
Figure 1G:
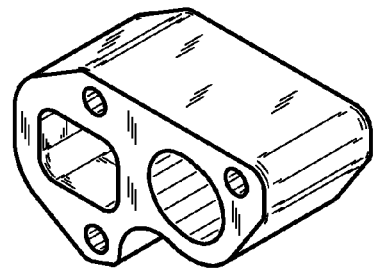
Figure 1F:
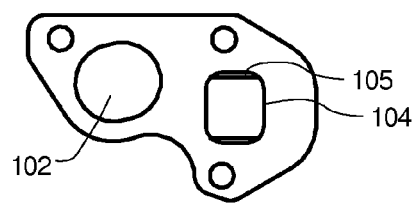

FIGS. 1A-1G show a left hand (LH) adaptor plate for a water pump. FIG. 1 is a front view of the LH adaptor plate. Bolt holes 101 are used to mount the adaptor plate on the front of the engine. An elongated hole 102 is used to route the water from the water pump to the engine. A second, larger rectangular hole 103 is used to route a different water stream from the water pump to the engine. In this case the larger hole is tapered to a smaller opening 104 so as to fit the engine front water port. FIGS. 1B-1G are a left view, top side view, right view, lower side view, bottom view, and a perspective view. FIG. 1F, in particular, shows how the bottom side of the rectangular hole 105 is adapted to fit the dimension of the engine water port by being slightly taller and narrower than the water pump side opening 103.

Figure 2:
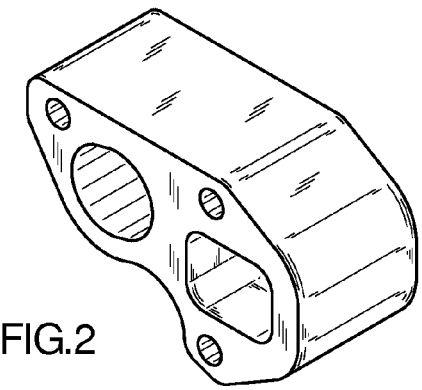
FIG. 2 is a right hand adaptor plate which is minor of the left hand adaptor plate.

FIG. 2 shows a perspective view of the right hand (RH) adaptor plate which is a mirror of the LH adaptor plate.

Figure 3:
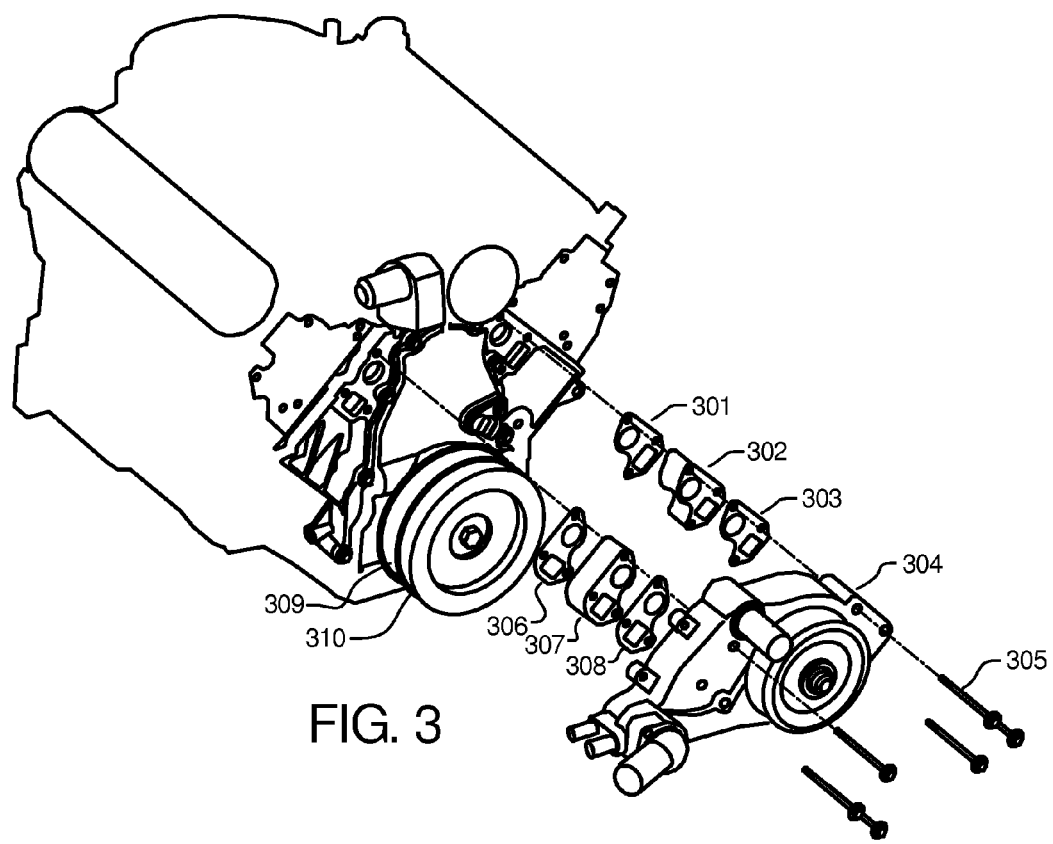
FIG. 3 is an exploded assembly showing an engine front, a pair of adaptor plates, gaskets, and a water pump.

FIG. 3 shows details of the assembly kit that mounts the water pump on a substantially centered location, i.e. substantially vertical middle of the engine as referenced by the belt pulley position. The water pump 304 is mounted on the motor using two gaskets 301, 303, a RH adaptor plate 302, and bolts 305. Additionally, gaskets 306, 308, and a LH adaptor plate 307 are used. Notably, there are two crank pulleys, a front pulley 310 and a back pulley 309, that are mounted side by side and either one can be used to drive peripheral components.

Figure 4:
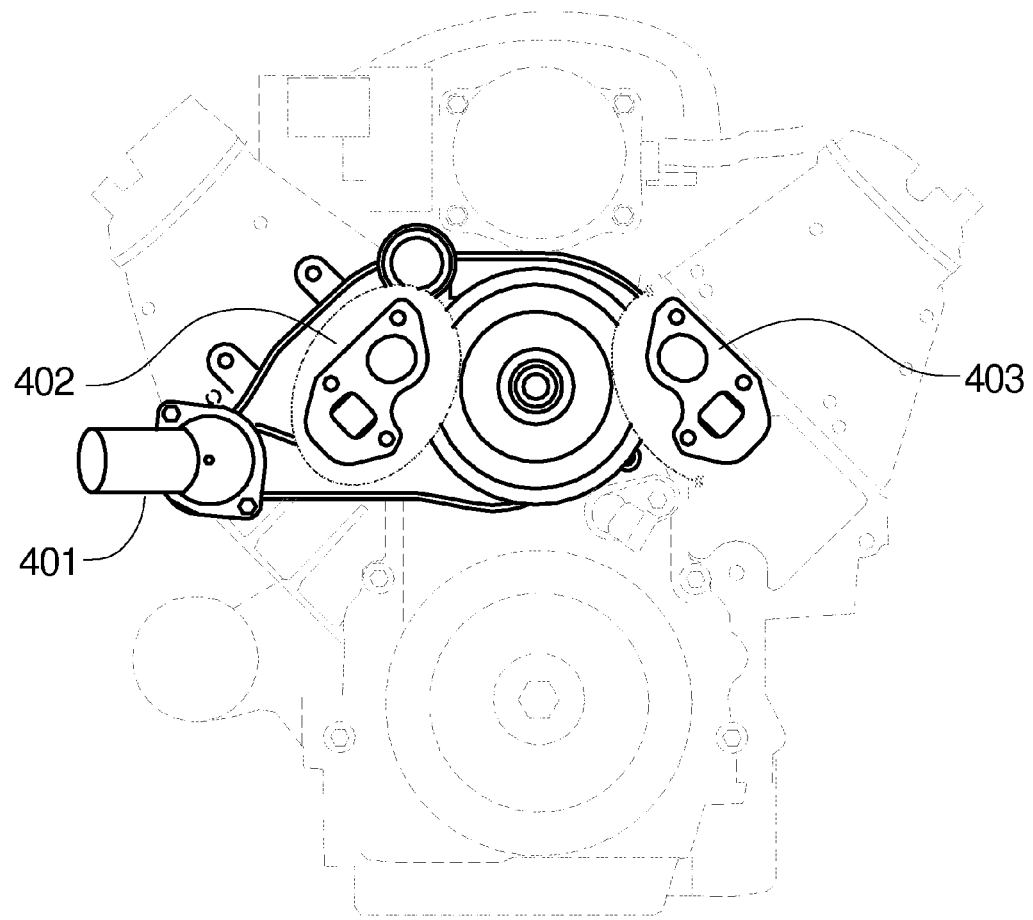
FIG. 4 shows the adaptor plates when positioned on the engine.

FIG. 4 shows adaptor plates when positioned on the engine. The parts of the water pump 401 is cut away to show the LH adaptor plate 402 and RH adaptor plate 403 underneath.

FIG. 5A shows one of two manufacture issued belt routing designs. The engine crank pulley 510 is used to drive an off center located water pump 511, an alternator 512, an air conditioning (A/C) compressor unit 513. A tensioner pulley 514 provides belt tension. Ribbing markings 515 show that the belt is a two sided ribbed belt.

The two sided ribbing belt is a problem for adapting the engine to include components like power steering or a standardized A/C compressor unit. Two sided ribbing belts are sold in limited sizes, and this restricts the alternative belt paths for these kind of modifications.

FIG. 5B shows two of two manufacture issued belt routing designs. The front and back engine crank pulleys 521a,b drive an off center located water pump 522, an alternator 523, and an A/C compressor unit 525. A belt tensioner 524 provides belt tension. The ribbing markings show that single ribbed belts are used. The A/C compressor unit 524 is driven off the back engine crank pulley. FIG. 5C shows the front crank pulley 521a and the back crank pulley 521b in perspective view.

It should be noted that this design shown in FIG. 5B requires two belts. The A/C compressor unit 525 is driven by a separate ribbed belt that is connected to the back crank pulley 525b. In this case, the belt that drives the A/C compressor unit is awkward as no provision for a normal belt tensioner is made. Belt tension is provided by a special tool that assists in mounting the belt, and the stretch in the belt provides tension. This design is not helpful in promoting belt life. On the plus side, both belts in this design are single ribbed.

Figure 5D:
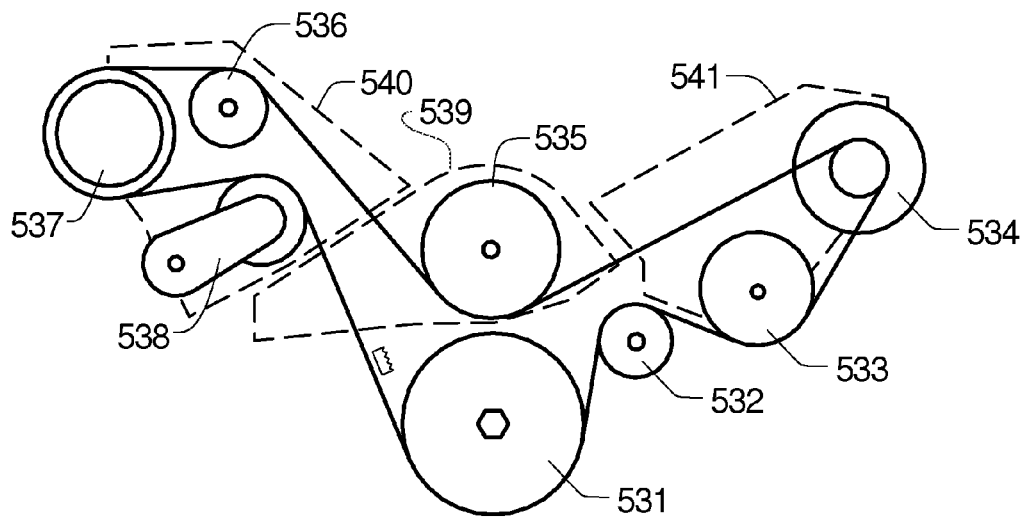
FIGS. 5D-5E show how the belt drive system is adapted to other potential belt routing paths when the water pump is centered on the engine as shown in FIG. 4.
Figure 5E:
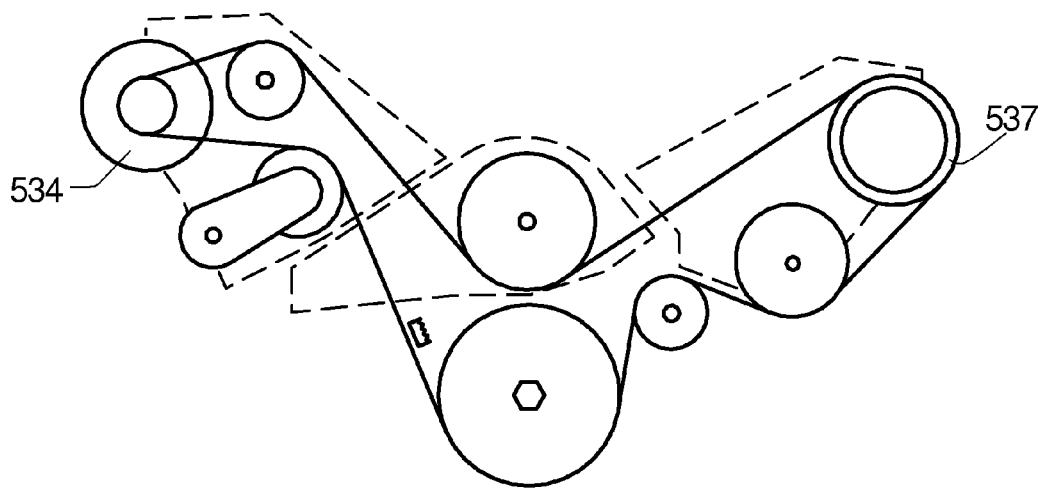

FIG. 5D shows an enhanced belt system design by use of added mounting brackets. The engine crank pulley 531 drives a power steering unit 533, an alternator 534, a centrally positioned water pump 535, and an A/C compressor unit 537. Two idler pulleys 532, 536 are also needed to provide suitable belt routing. A tensioner 538 provides belt tension. The water pump housing is sketched in a rough outline 539 along with a left and right side mounting brackets 540, 541 for the peripheral components. The ability to centrally locate the water pump is a distinct advantage of the embodied invention as it provides flexibility in how peripheral components are mounted.

In this layout, a single belt drives all of the peripheral components. Only a single side ribbing belt is needed. It is an advantage to use a single sided ribbed belt as the double sided ribbed belts are sold in limited lengths. The water pump 535, idler pulley 532, and tensioner 538 all use the smooth side of the belt. A power steering unit 533 has been added which is not included in the standard manufacturer design. The A/C compressor unit 537 is separated from the engine mounting and belt routing which provides for the A/C compressor unit to be any desired style, i.e. older A/C when retrofitting an older vehicle, or installing a modern A/C compressor unit.

Other benefits are seen in the ability to adapt the right side mounting bracket 541 to provide use of a variety of different alternators and power steering units. Also, the positions of the A/C compressor unit, the alternator, and the power steering unit can be changed as needed based on the space available for the engine. Only the mounting brackets 540, 541 need to be modified.

The design then provides enhanced flexibility to fit the engine into older classic car engine spaces, current car and truck engine compartments, and also new kit cars. Also the design provides for expanded capability to locate peripheral components, such as air compressor units, brake units, power steering units, and alternators, in different locations such as are needed to fit/retrofit the GM Small Block V8 Gen 5 engine into a variety of engine compartments. The capability to do this is a distinct advantage of the embodied invention.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. Adaptor plates in a coolant assembly designed to locate a water pump at a substantially centered location on an engine comprising:
   a) said water pump with four water pump coolant ports,
   b) said engine with four engine coolant ports,
   c) a pair of said adaptor plates, wherein each said adaptor plate further comprises:
      i) an engine side and a pump side,
      ii) a first rectangular opening, wherein
         1. said first rectangular opening is located on said engine side of said adaptor plate,
         2. said first rectangular opening corresponds to one said coolant port of said engine,
      iii) a second rectangular opening, wherein
         1. said second rectangular opening is located on said pump side of said adaptor plate,
         2. said second rectangular opening corresponds to one said coolant port of said pump,
      iv) wherein said first rectangular opening and said second rectangular opening are connected, and
      v) an elongated opening, wherein said elongated opening is located on
         1. said pump side of said adaptor plate and corresponds to a coolant port on said water pump,
         2. said engine side of said adaptor plate and corresponds to a coolant port on said engine,
      and
   d) a pair of gaskets associated with each said adaptor plate.

2. The adaptor plates of claim 1, wherein said water pump is a mechanical water pump designed to be powered by a belt connected to said engine.

3. The adaptor plates of claim 1, wherein said engine is a GM small block V8 Generation 5 engine.

4. Adaptor plates in a coolant assembly designed to locate a mechanical water pump at a substantially centered location on an engine comprising:
   a) said mechanical water pump with four pump coolant ports,
   b) said engine with four engine coolant ports,
   c) a pair of said adaptor plates, wherein each said adaptor plate incorporates two coolant pathways,
   d) wherein said adaptor plates are designed to interconnect said four pump coolant ports to said four engine coolant ports,
   e) wherein said mechanical water pump is designed to be located at a substantially centered location on said engine,
   f) wherein said mechanical water pump is powered by a belt connected to an engine pulley,
   g) at least one peripheral component attached to said engine, and
   h) wherein any said peripheral component is powered by said belt.

5. The adaptor plates in a coolant assembly of claim 4, wherein said engine is a GM small block V8 Generation 5 engine.

6. The adaptor plates in a coolant assembly of claim 4, wherein said peripheral component is attached to said engine by use of a mounting plate.

\* \* \* \* \*